(12) United States Patent
Girgensohn et al.

(10) Patent No.: US 7,480,442 B2
(45) Date of Patent: Jan. 20, 2009

(54) SYSTEMS AND METHODS FOR GENERATING MULTI-LEVEL HYPERVIDEO SUMMARIES

(75) Inventors: Andreas Girgensohn, Menlo Park, CA (US); Frank M. Shipman, III, College Station, TX (US); Lynn D. Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 947 days.

(21) Appl. No.: 10/612,428

(22) Filed: Jul. 2, 2003

(65) Prior Publication Data
US 2005/0002647 A1   Jan. 6, 2005

(51) Int. Cl.
G11B 27/00   (2006.01)
H04N 5/93   (2006.01)
H04N 5/91   (2006.01)
H04N 9/00   (2006.01)

(52) U.S. Cl. ..................... 386/52; 4/55; 4/95
(58) Field of Classification Search ..... 386/4, 386/95, 52, 55
See application file for complete search history.

(56) References Cited

U.S. PATENT DOCUMENTS

| | | | |
|---|---|---|---|
| 6,829,781 B1 * | 12/2004 | Bhagavath et al. | 725/94 |
| 6,931,594 B1 * | 8/2005 | Jun | 715/719 |
| 7,035,435 B2 * | 4/2006 | Li et al. | 382/107 |
| 7,181,757 B1 * | 2/2007 | Kim et al. | 725/61 |
| 2003/0189588 A1 | 10/2003 | Girgensohn | |
| 2003/0190143 A1 | 10/2003 | Girgensohn | |

OTHER PUBLICATIONS

U.S. Appl. No. 09/618,649, filed Jul. 18, 2000, Andreas Girgensohn.
U.S. Appl. No. 09/618,533, filed Jul. 18, 2000, Andreas Girgensohn.
Avrahami, G., Brooks, K.P., and Brown, M.H.,"A Two-View Approach to Constructing User Interfaces," *ACM SIGGRAPH '89*, Boston, Jul. 31-Aug. 4, 1989.
Boreczky, J. and Wilcox, L., "A Hidden Markov Model Framework for Video Segmentation Using Audio and Image Features," in *Proc ICASSP '98*, IEEE, May 1998, Seattle.
Boreczky, J. and Rowe, L., "Comparison of Video Shot Boundary Detection Techniques," *Proc. SPIE Storage and Retrieval for Image and Video Databases IV*, San Jose, CA, 1996.

(Continued)

*Primary Examiner*—Thai Tran
*Assistant Examiner*—Daquan Zhao
(74) *Attorney, Agent, or Firm*—Fliesler Meyer LLP

(57) ABSTRACT

A hypervideo summary comprised of multiple levels of related content and appropriate navigational links can be automatically generated from a media file such as a linear video. A number of algorithms and selection criteria can be used to modify how such a summary is generated. Viewers of an automatically-generated hypervideo summary can interactively select the amount of detail displayed for each portion of the summary. This selection can be done by following explicit navigational links, or by changing between media channels that are mapped to the various levels of related content.

This description is not intended to be a complete description of, or limit the scope of, the invention. Other features, aspects, and objects of the invention can be obtained from a review of the specification, the figures, and the claims.

20 Claims, 8 Drawing Sheets

| 200 | Take 1 | | | | | Take 2 | | | Take 3 | | | Take 4 | | | |
|---|---|---|---|---|---|---|---|---|---|---|---|---|---|---|---|
| | Cl 1 | Cl 2 | Cl 3 | Cl 4 | Cl 5 | Cl 6 | Cl 7 | Cl 8 | Cl 9 | Cl 10 | Cl 11 | Cl 12 | Cl 13 | Cl 14 | Cl 15 |
| Level 1 | | | | | | | | | | | | | | | |
| Level 2 | | | | | | | | | | | | | | | |

OTHER PUBLICATIONS

Christel, M., Smith, M., Taylor, C., and Winkler, D., "Evolving Video Skims into Useful Multimedia Abstractions," in *Human Factors in Computing Systems, ACM CHI '98 Conference Proceedings*, pp. 171-178, Los Angeles, Apr. 1998.

Girgensohn, A. and Boreczky, J. "Time-Constrained Keyframe Selection Technique," in *IEEE Multimedia Systems '99, IEEE Computer Society*, vol. 1, pp. 756-761, 1999.

He, L., Sanocki, E., Gupta, A., and Grudin, J., "Auto-Summarization of Audio-Video Presentations," *ACM Multimedia*, Apr. 1999.

Knuth, D., *The $T_{E}X book$*, Addison-Wesley, 1984.

Pfeiffer, S., Lienhart, R., Fischer, S. and Effelsberg, W., "Abstracting Digital Movies Automatically," in *Journal of Visual Communication and Image Representation*, vol. 7, No. 4, pp. 345-353, Dec. 1996.

Smith, M. and Kanade, T., "Video Skimming and Characterization through the Combination of Image and Language Understanding Techniques," in *Proc. Computer Vision and Pattern Recognition*, pp. 775-781, 1997.

Uchihashi, S. and Foote, J., "Summarizing Video Using a Shot Importance Measure and a Frame-Packing Algorithm," in *Proc. ICASSP '99*, vol. 6, pp. 3041-3044, 1999.

Webster, B.F. *The NeXT Book*, Addison-Wesley, 1989.

Gross, G., "Molecular Mechanics Optimisation," http://www.chem.swin.edu.au/modules/mod6/molmech_1.html, Oct. 9, 2000.

Cooper, M. and Foote, J., "Summarizing Video using Non-Negative Similarity Matrix Factorization," 2002 IEEE.

Girgensohn, A., Boreczky, J., Chiu, P., Doherty, J., Foote, J., Golovchinsky, G., Uchihashi, S., and Wilcox, L., "A Semi-Automatic Approach to Home Video Editing," *Proceedings of UIST '00*, pp. 81-89, 2000.

Lienhart, R., "Dynamic Video Summarization of Home Video," *SPIE 3972: Storage and Retrieval for Media Databases 2000*, pp. 378-389, 2000.

Marchionini, G. and Geisler, G., "The Open Video Digital Library," *D-Lib Magazine*, vol. 8, No. 12 http://www.dlib.org/dlib/december02/marchionini/12marchionini.html, Dec. 2002.

Smith, J.M., Stotts, D. and Kum, S.-U., "An Orthogonal Taxonomy For Hyperlink Anchor Generation in Video Streams Using OvalTine," *Proc. Of ACM Hypertext 2000*, pp. 11-18, 2000.

Sundaram, H. and Chang, S.-F., "Condensing Computable Scenes Using Visual Complexity and Film Syntax Analysis," *Proceedings of ICME 2001*, pp. 389-392, 2001.

Uchihashi, S., Foote, J., Girgensohn, A. and Boreczky, J., "Video Manga: Generating Semantically Meaningful Video Summaries," *Proceedings of ACM Multimedia '99*, pp. 383-392.

Boissière, G., "Automatic creation of hypervideo news libraries for the World Wide Web," *Hypertext '98 Proceedings, ACM*, Pittsburgh, PA, 1998.

Yeung, M.M., and Yeo, B.-L., "Video Visualization for Compact Presentation and Fast Browsing of Pictorial Content," *IEEE Transactions on Circuits and Systems for Video Technology*, vol. 7, No. 5, Oct. 1997.

Zhang, H.J., et al., "Automatic Parsing and Indexing of News Video," *Multimedia Systems*, 2 (6), pp. 256-266, 1995.

Russell, D., "A Design Pattern-based Video Summarization Technique: Moving from Low-level Signals to High-level Structure," *IEEE 33rd Hawaii International Conference on System Sciences*, vol. 3, Maui, Hawaii, Jan. 4-7, 2000.

Wildemuth, B., et al., "How Fast Is Too Fast? Evaluating Fast Forward Surrogates for Digital Video," *JCDL '03* May 1-2, 2003, Houston, Texas.

* cited by examiner

SYSTEMS AND METHODS FOR GENERATING MULTI-LEVEL HYPERVIDEO SUMMARIES

CROSS-REFERENCED CASES

The following applications are cross-referenced and incorporated herein by reference:

U.S. patent application Ser. No. 10/116,026 entitled "A System for Authoring and Viewing Detail on Demand Video," by Andreas Girgensohn et al., filed Apr. 3, 2002.

U.S. patent application Ser. No. 10/116,012 entitled "Reduced Representations of Video Sequences," by Andreas Girgensohn et al., filed Apr. 3, 2002.

FIELD OF THE INVENTION

The present invention relates to generating multi-level summaries for video files and segments.

BACKGROUND

Several approaches to interactive video have been developed to allow a user to interface with digital video systems. One such approach provides optional side trips, which allow users to follow a link out of the currently playing video in order to watch an alternate video sequence. At the end of the alternate sequence, or upon user input, the video presentation returns to the original video departure point and continues to play from that point. For example, some DVDs include options for viewers to follow links out of the currently playing video to watch other video clips. When a link is active, an icon appears on top of the playing video. The viewer can press a button on a remote control to jump to the alternative video. For example, certain DVD movies provide links that take a viewer to video segments explaining how a particular scene in the movie was filmed. Afterwards, the original video continues from where the viewer left.

Expanding on the concept of optional side trips in video, detail-on-demand video includes one or more base video sequences each having one or more alternate video sequences. Each alternate video sequence provides additional details related to the base video sequence. During video playback, users can select the alternate video sequence to view this additional detail.

Upon user input or completion of the alternate video sequence, the presentation returns to the base video sequence. The author may determine the location where the presentation resumes. Additionally, alternate video sequences can include links to other video sequences, thereby creating a hierarchical structure in which video sequences providing additional detail may in turn contain links for sequences having even more detail.

The nature of detail-on-demand video is well suited for applications such as creating training or "how-to" videos. In such an application, viewers can control the level of explanation they receive by following links to the appropriate level. Base video sequences can present an overview of the information at an abstract or relatively "high" level. Users can follow a link from a base video sequence in order to view a more detailed presentation in an alternate video sequence. Further detail can be provided by linking the alternate video sequence to yet another video sequence, which in turn can link to another video sequence, and so on. This hierarchical presentation allows the viewer to select and view detailed presentations of certain topics, such as topics in which the viewer needs the most help, while skipping over or viewing high-level presentations of more familiar portions. Such video guides can serve a wide audience by presenting a customized level of detail for each viewer, and can save the viewer time by avoiding detailed presentations of information already familiar to, or of little interest to, the user.

Home video editing is another application for detail-on-demand video. Home users can create video summaries of family activities or other home movies. More detailed presentations of different activities can be linked to the base video sequence to provide additional footage of interest. For example, a family video Christmas card may contain a main video sequence summarizing family activities for the year. Viewers can select a link during each portion of the main video sequence to view additional video from the family activity of interest. For example, a grandparent may select additional video sequences of grandchildren, while other relatives may select addition details of a party or family reunion.

Detail-on-demand video was designed to support the authoring and use of interactive video in a wide variety of applications. Characteristics of video representations meeting this design goal include a hierarchical structure where video clips are combined into composites, as well as links between elements in this hierarchy.

FIG. 1 shows a diagram of an exemplary detail-on-demand summary as described in U.S. patent application Ser. No. 10/116,026, including two hierarchically organized video segments 100, 110 and three links 116, 118, 120 between those video segments. The first link 116 is from "composite 3" 104 to "composite 6" 110, the second link 118 from "clip 5" 122 to "composite 8" 114 and the third link 120 from "clip 11" 126 to "clip 7" 124. If more than one link can be active at a particular time, which can happen if links are specified for multiple levels of the hierarchy, the lowest-level link can be set to have precedence.

While detail-on-demand videos can provide an interactive summary for access into longer linear videos, human authoring of such summaries is very time consuming and not cost effective if the summary will only be used a few times. While the editing of video typically involves the selection and sequencing of video clips into a linear presentation, which in itself can be a lengthy process, authoring detail-on-demand video is more complicated as it involves the authoring and interlinking of one or more such linear video presentations.

In many such presentations, individual video clips must be selected and grouped into video composites as higher-level building blocks. Video clips and/or composites must be selected to be the source or destination anchor for each navigational link used to link the building blocks of related material. Source anchors must be selected that can specify the starting point at which a link becomes active, as well as the length of time for which the link is active. Destination anchors must be selected that can specify the starting point and length of the video played as a result of a viewer traversing the active link. Unlike hyperlinks in Web pages or in most hypervideo systems, the link destination is not just a starting point but an interval of content. The person creating the summary must also determine where playback will continue upon completion of the video viewed using the link or when the viewer aborts the playing of that video.

The length of time necessary for an individual to create such a detail-on-demand summary can be undesirable in many situations, such as the summarizing of home movies for consumer applications. It would be preferable in many situations to present a way to shift most, if not all, of the time and effort necessary to create such hypervideo summaries away from the end users.

DESCRIPTION OF THE FIGURES

FIG. 2 is a diagram showing the segmenting of a linear video into clips, in accordance with one embodiment of the present invention.

FIG. 3 is a diagram showing the selection of clips from the diagram of FIG. 2.

DETAILED DESCRIPTION

Systems and methods in accordance with embodiments of the present invention can overcome deficiencies in existing video summarization approaches by automatically generating hypervideo summaries comprised of multiple levels of related content. Such a summary can be generated by automatically selecting short clips from the original video, such as through an authoring and playing interface for "detail-on-demand" video. Such a process can generate summaries at different levels of detail, group clips into composites, and place links between composites at different summary levels. Clips can be selected based on properties or "goodness" criteria such as technical suitability, which can be determined automatically from factors such as camera motion, and on temporal location in the source video. Certain embodiments can also allow the resulting hypervideo to be edited in the workspace.

Detail-on-demand video summaries differ from other hierarchical video summaries in that users can request additional detail while playing the video rather than having to use a separate interface consisting of keyframes or a tree view. While each level of a detail-on-demand summary can be similar to a linear video summary, a significant difference can be that users are able to request additional detail for parts of the video rather than being restricted to a predetermined level of detail.

Each level of a generated, interactive summary can be of a different length, with the top level being a rapid overview of the content and the lowest level containing the entire source video. The generation of the multi-level video summary can include at least three basic decisions, including for example: (1) how many levels to generate (and, possibly, the length of each level), (2) which clips from the source video to show in each summary, and (3) which links to generate between the levels of the summary.

Figure 7:
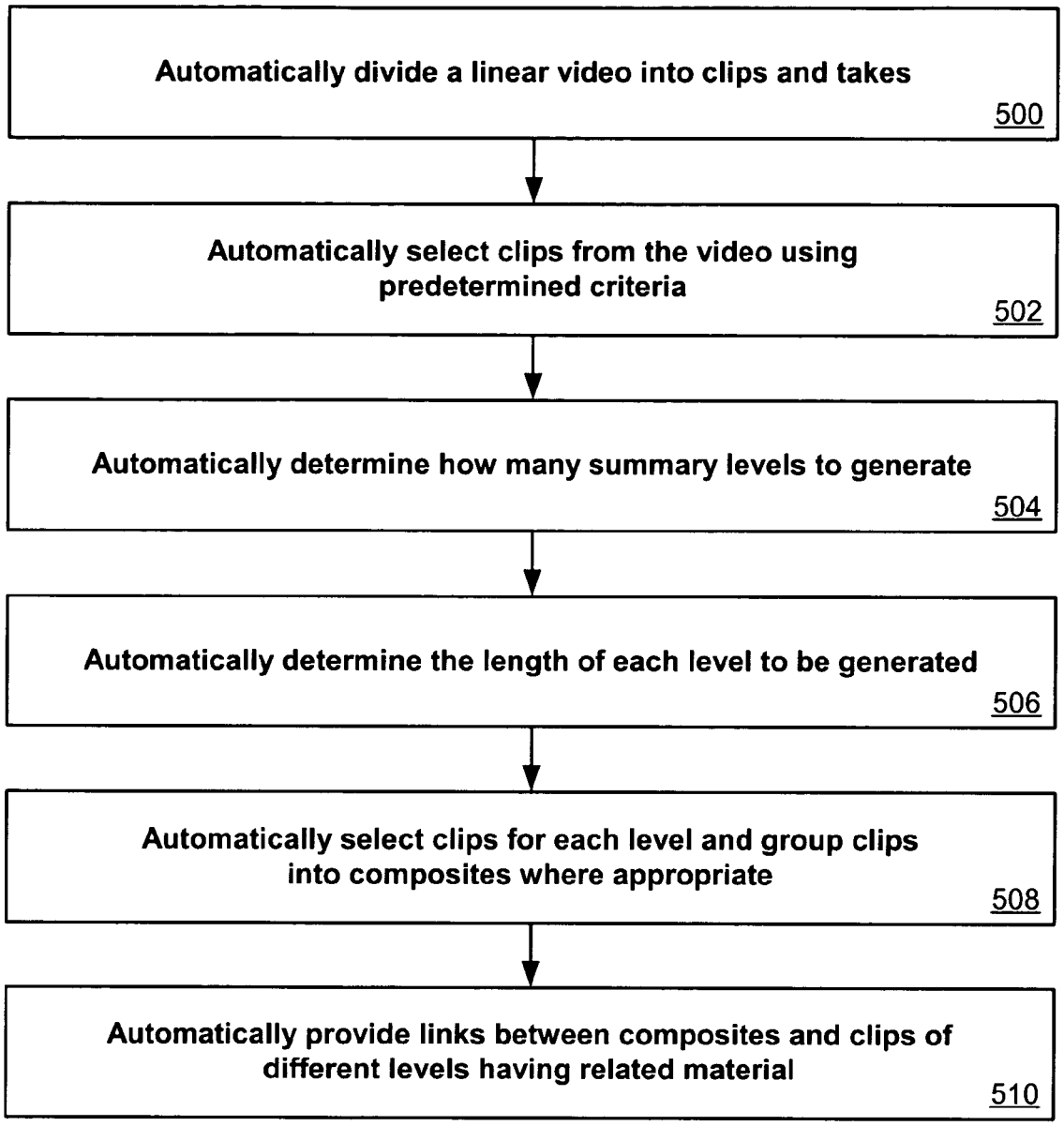
FIG. 7 is a flowchart showing a process for automatically generating hypervideo summaries in accordance with one embodiment of the present invention.

An exemplary approach to automatically generating such a hypervideo summary is shown in FIG. 7. Such an approach can be utilized with any appropriate device, such as may include a desktop PC, video workstation, digital video camera, or home electronic device, and can be implemented through hardware or software, or a combination of hardware and software. A linear video, such as a home movie or production video, can be automatically divided into clips and takes using any appropriate segmenting criteria or determination mechanism 500, such as those described herein. Clips from the video can be automatically selected using predetermined criteria 502. The number of levels to be included in a summary can be determined automatically 504, as well as the length of each level to be generated 506. Clips to be utilized for each level can be automatically selected and grouped into composites where appropriate 508. Links can then be automatically generated or provided between composites and/or clips of different levels having related material 510.

The number of levels to be included in such an interactive summary can be dependent upon any appropriate characteristic of the video, such as the length of the source video. For example, a single 30-second video summary might be generated for videos that are under five minutes in length. For a video between 5 and 20 minutes in length, two summaries can be generated: one summary being 30 seconds in length and the second being 3 minutes in length. For videos over 20 minutes in length, three summaries can be generated: one summary that is 30 seconds long, one summary that is three minutes long, and the last summary being one quarter the length of the total video up to a maximum of 10 minutes. The number of summaries and length of each summary can vary, and the original video lengths at which the generated summaries change can vary. The lengths and numbers of summaries can be hard coded into the system, placed into an options display for selection by a user, or completely dependent upon the choice of the user. Where the choices are not hard coded, the choices can be selected by any appropriate means, such as by selecting from a list or entering values into a text area.

An exemplary algorithm can segment a linear video or video file into video segments, such as "takes" and "clips." Takes and clips can be defined in any of a number of appropriate ways, using any of a number of segmenting criteria, that would be understood to one of ordinary skill in the art. For example, when segmenting an un-produced or "home" video, takes can be defined by the turning on and/or turning off of the camera that is recording the video. Clips can be defined as sub-segments of these takes generated by analyzing the video and determining, for example, good quality segments. Here, good quality can be defined by a smooth camera motion, or lack of camera motion, as well as good lighting levels or other measures of video quality. For produced or other types of video, takes can be defined as scenes, and clips can be the shots of the video. Scenes and clips can be identified using any of a number of existing techniques. An exemplary algorithm can alternatively assume that the video has first been segmented into "takes" and "clips."

An exemplary algorithm can select clips to use for each summary level using a selection process that may be closely related to traditional video summarization. For example, an algorithm can select clips based on the distribution of the clips in the video. Such an algorithm can be geared toward un-produced video, where clips can have been selected by their video quality. An alternative algorithm can assume that an external goodness measure has been computed for the clips or shots. Such an algorithm can be more suitable for produced video, such as professional training videos, wherein the clips and scenes can be well defined.

In developing an algorithm such as those described above for un-produced video, one approach attempts to identify an array of a number (m) of high-quality video clips through an analysis of video properties such as camera motion and lighting. An average clip length (C) can be calculated, pre-determined, or selected, such as by a user or system developer, so that the number (n) of clips needed for a summary is the length of the summary (S) in seconds divided by the average clip length, or n=S/C. So, for a three-minute video summary, and an average clip length of 3.5 seconds, using this algorithm would suggest selecting approximately 51 clips for the summary.

Figures 2, 3:
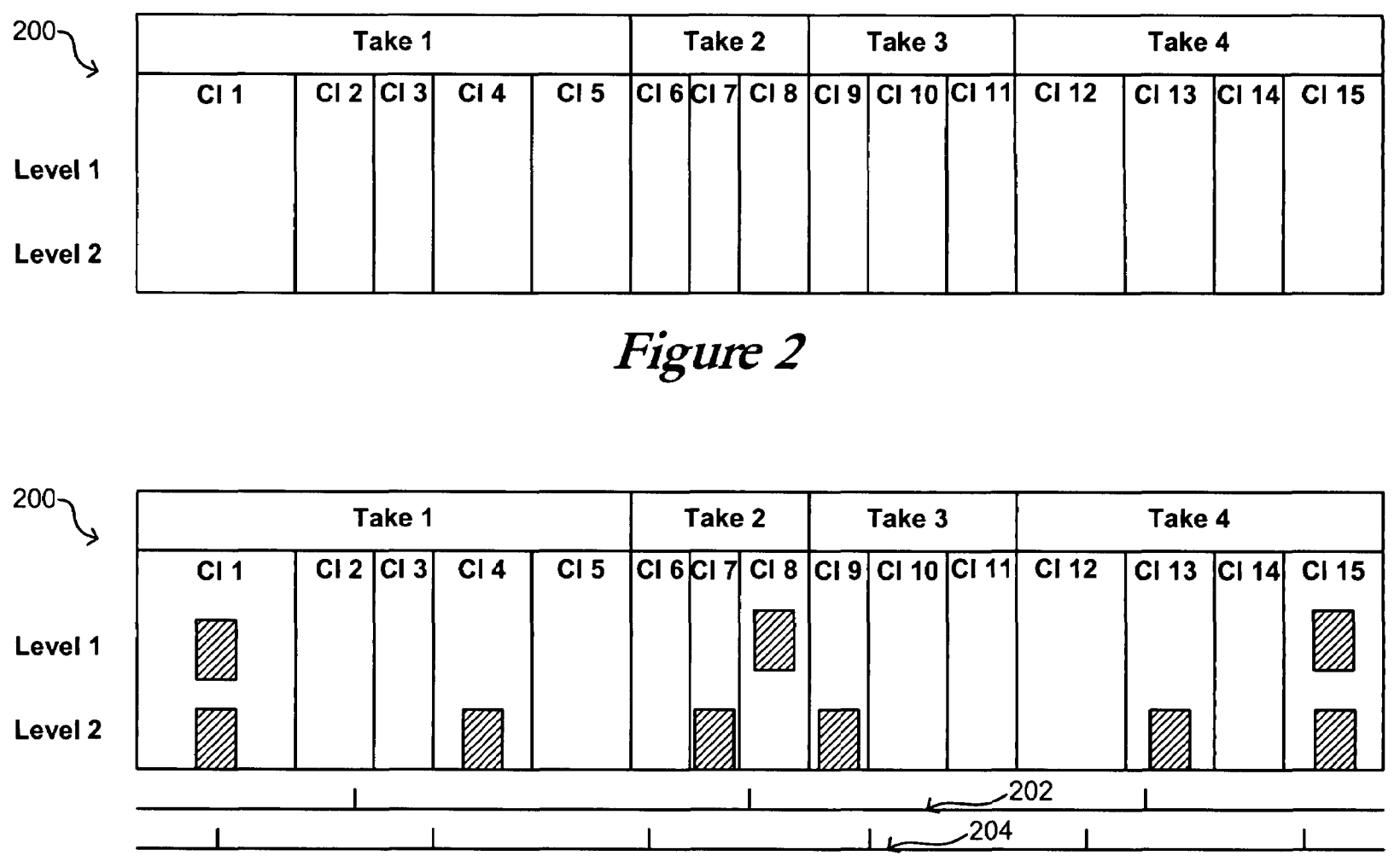

In some embodiments, it can be guaranteed that the first and last clip are contained in each summary, with the remainder of the clips being distributed, evenly or otherwise, in the array of potential clips. If even distribution is selected, such an algorithm can select one clip every (m−1)/(n−1) potential clips. FIG. 2 shows an exemplary linear video summary 200 composed of 15 high-value clips that were automatically identified in a four-take source video. These clips can represent the entire original video, or a subset of the entire video. The use of an estimate of average clip length can generate summaries of approximately the desired length, rather than exactly the requested length. Such an algorithm can be easily altered to support applications requiring summaries of exact lengths, such as by modifying in/out points in the selected clips rather than accepting the in/out points determined by video analysis.

An alternative algorithm can use the same segmentation of the video of length (L) into takes and clips. For the first level, a length $L_1$ can be set, such as 30 seconds, and a clip length $C_1$ can be set, such as 3 seconds, to pick $n=(L_1/C_1)$ clips. The centers of intervals of length L/n can be checked, and a clip can be included from each of the takes at those positions. This can be seen, for example, at the bottom of FIG. 3 for timelines 202, 204 with the centers of 3 and 6 intervals, respectively. The clip closest to the interval center can be selected. If more than one interval center hits the same take, the clip closest to the center of the take can be selected. If fewer than n clips are selected, an algorithm or system can look for takes that have not been used, such as because those clips were too short to be hit. One clip can be selected from each of those takes, starting with the clip that is furthest away from the already-picked clips, until n clips are picked or there are no more takes that have not been used. If still fewer than n clips are picked, an additional clip can be picked from each take in descending order of the number of clips in a take, or in descending order of take duration, until enough clips are picked, such as for example the clips shown as selected for Level 2 in FIG. 3 which could have been picked using this approach. Picking three and more clips per take can continue if picking two clips per take is insufficient. A similar approach can be used for the second level with lengths $L_2$, such as 180 seconds, and clip length $C_2$, such as 5 seconds. FIG. 3 shows an example of how such an algorithm can select clips from the same source video 200 as shown in FIG. 2. Since the takes and clips are of relatively even lengths, both algorithms can produce similar results. Different application requirements can, however, make one algorithm more suitable.

Both of the exemplary algorithms described above can provide glimpses into a source video at somewhat regular intervals, with the un-produced video algorithm using the number of clips or shots as a measure of distance and the produced video algorithm using playing time as a measure of distance. Another algorithm could, for example, use a "goodness" value for clips and select the highest value clips first. Such an algorithm could guarantee that each level of the summary would be a superset of the higher (shorter) levels of the summary. Such an algorithm can be of greater value for edited content, such as in cases of training video, where more general content may be preferred to video on more specialized topics.

Figure 1:
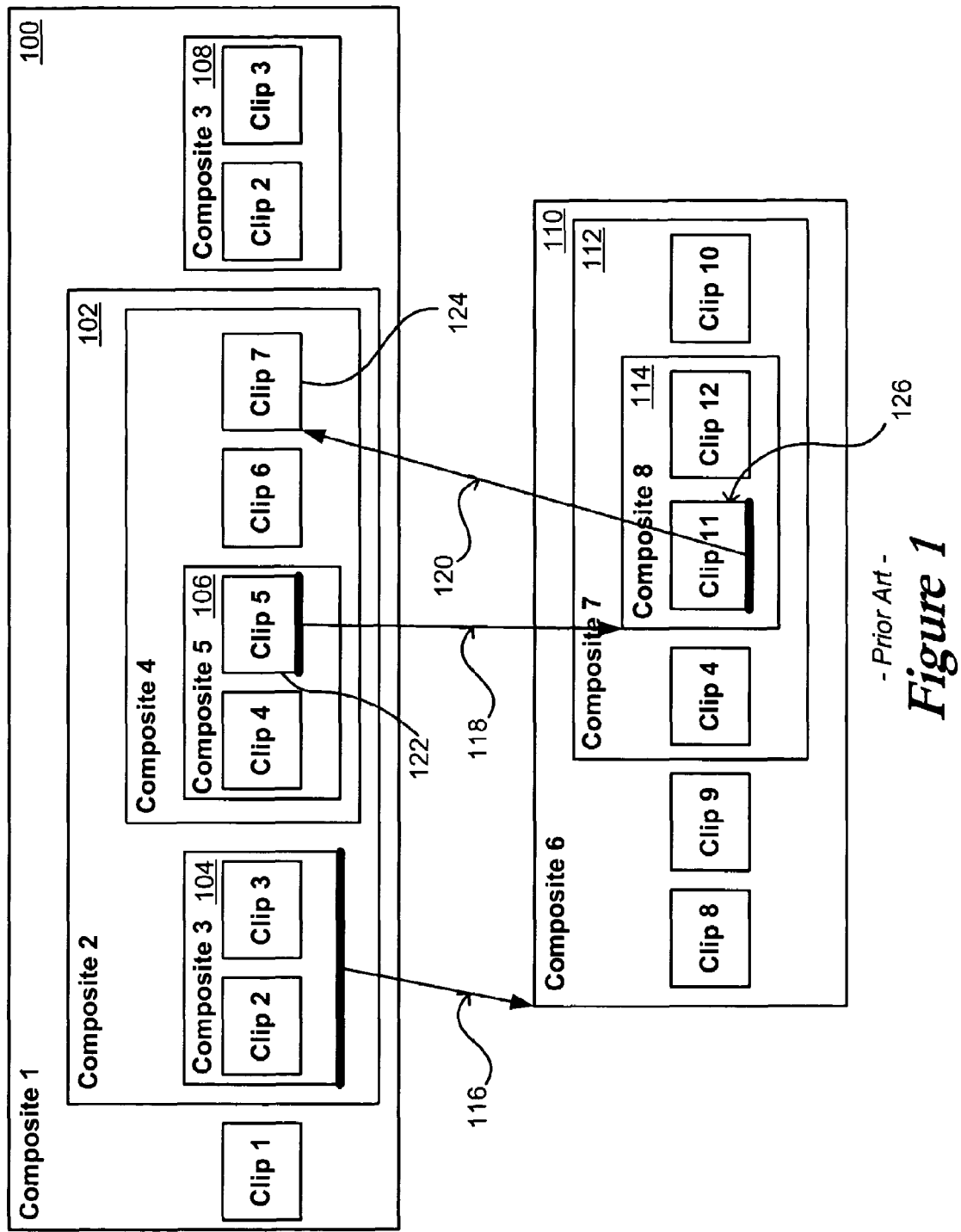
FIG. 1 is a diagram showing a multi-level summary of the prior art.
Figure 4:
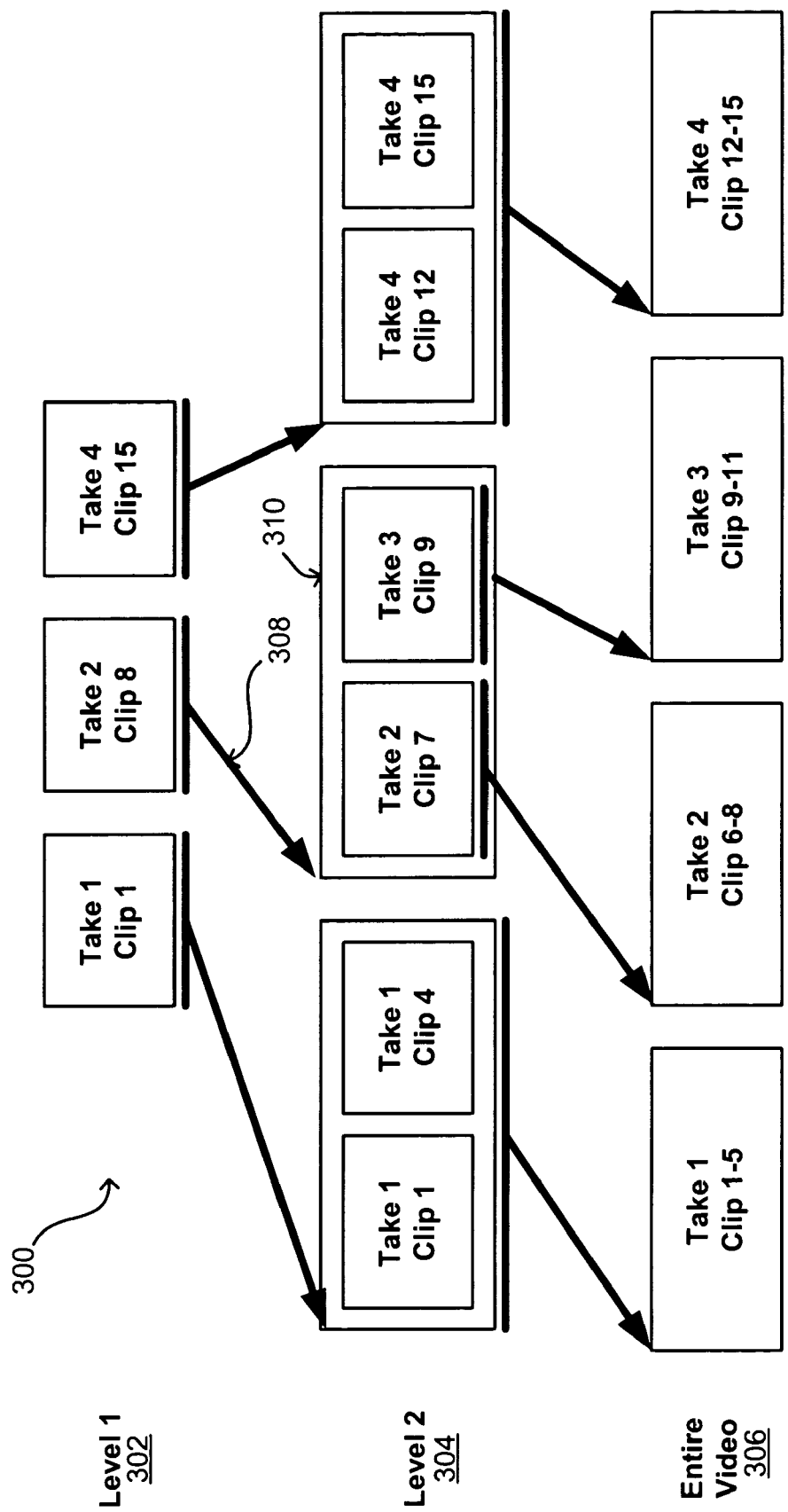
FIG. 4 is a diagram showing a linked multi-level summary using the clip selection of FIG. 3.

Once a multi-level summary has been generated, links can be generated between the levels. Links can be used to take a user or viewer from a clip at one level to the corresponding location(s) in the next lower level. Viewers can navigate from clips of interest to additional content from the same, or approximately the same, period. FIG. 4 shows an example of a summary 300 having two levels 302, 304 created from the fifteen high-value clips identified from the four-take source video of FIGS. 2 and 3.

Generating links can include a number of decisions. A link in one embodiment can be a combination of a source anchor, a destination anchor, a label, and return behavior(s) for both completed and aborted playback of a destination. For example, link generation can be based on takes or scenes. All clips from a particular take can be grouped into a composite that will be a source anchor for a link to the next level. A composite in a higher-level summary can be linked to the sequence of clips from the same take in the next level. If a take is not represented in a higher level, that take can be included in the destination anchor for the link from the previous take. For example, the link 308 from the middle clip in the top level of the summary shown in FIG. 4 has Clip 8 in Level 1 as the source anchor of the link. The destination anchor 310 is a composite composed of Clip 7 and Clip 9. Clip 9, which is from Take 3, has been included because there was no clip from Take 3 in Level 1.

Link labels can be used to provide information about the number of clips and length of the destination anchor. Algorithms that generate textual descriptions for video based on metadata, including transcripts for example, can be used to produce labels with more semantic meaning. Link return behaviors for both completed and interrupted destination playback can default to returning to the point of original link traversal. Returning to the end of the source anchor, rather than the point of link traversal, at destination completion can provide a more efficient summary. Having both links return to the beginning of the source anchor at destination completion can provide the greatest context for the person viewing the summary.

Figure 5:
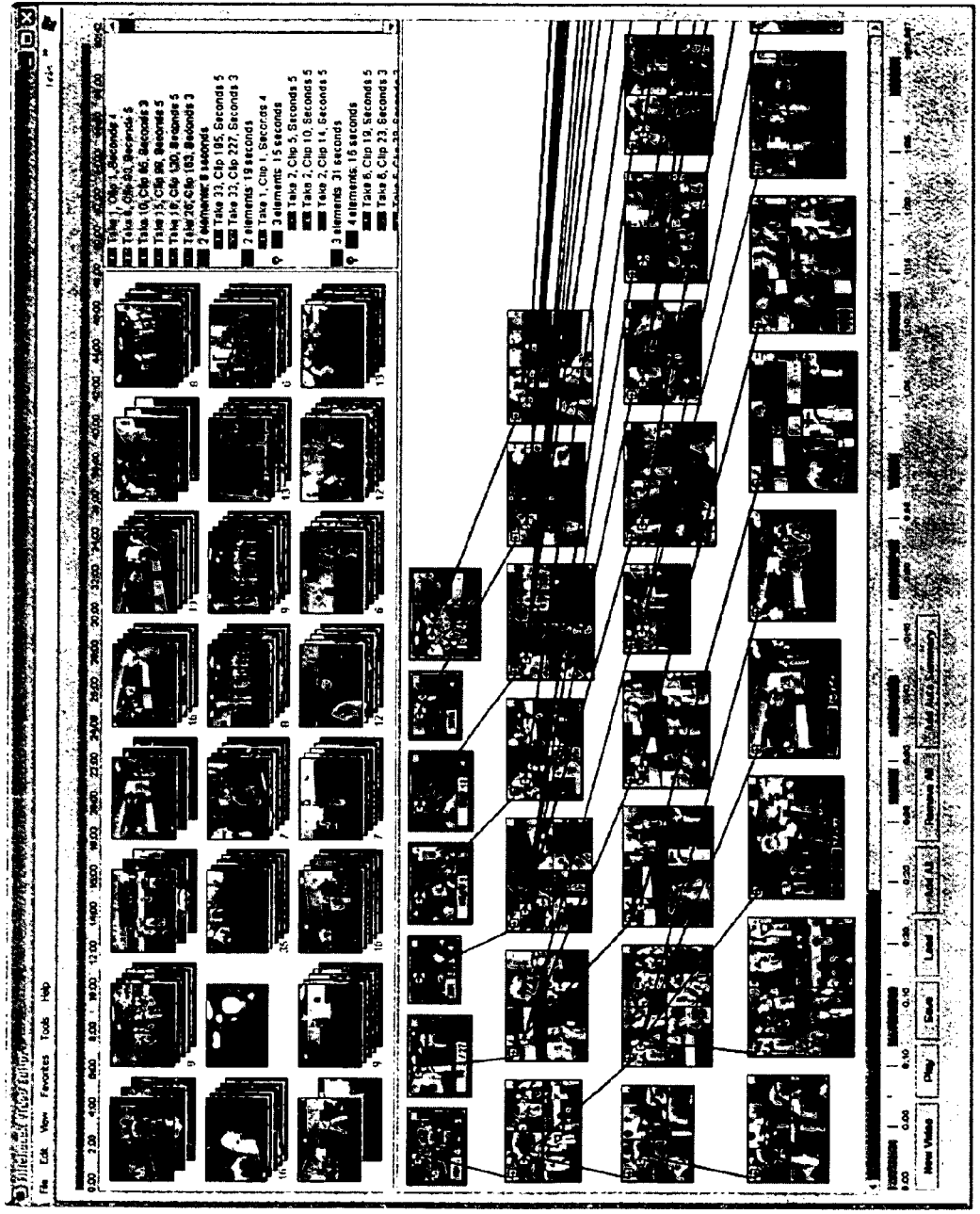
FIG. 5 is a diagram showing another automatically generated interactive video including three summary levels and the source video.

While algorithms such as those described above can be used to automatically generate multi-level summaries with navigational links between the levels of summary to support video browsing, authors can be provided with the ability to refine the automatically generated interactive summary, such as in cases where the interactive summary may be used many times. An example of such a case is an index to a training video. A graphical layout for editing a hypervideo summary can be automatically generated in the workspace. Each layer of the summary can be presented in the layout as a horizontal list of clips and/or composites. Links can be represented in the workspace through the normal link visualization of arrows into and out of the keyframes and composite visualizations. FIG. 5 shows part of an exemplary four-level summary generated by an un-produced video algorithm, such as described above, for a one-hour, 33-take martial arts video.

Correlated Media Channels

While automatically-generated hypertext summaries such as those described above can provide significant advantages over existing video summaries, a problem that may remain for certain users is that hypermedia systems consisting of linked audio and/or video have proven difficult for people to navigate. The classic problems associated with navigating hypertext, namely spatial disorientation and cognitive overhead, are exacerbated in the case of hypermedia navigation. Spatial disorientation is typically caused by unfamiliar and/or complex link structures, leading to confusion as to the location of a user or to where the user should go from that location. Cognitive overhead consists of keeping track of link structure and link navigation history. Examples of cognitive overhead occurring in typical user tasks are reflected by a user being confused as to whether an item is a link and, if so, whether the user should take the link, has already taken the link, might have missed a link, or might not be able to return if taking the link. In addition to tracking link structure, navigation history, and deciding whether and when to follow links, users of typical hypermedia systems must simultaneously be attentive to the changing media content, which incurs its own cognitive overhead.

The problems of spatial disorientation and cognitive overhead are compounded with linked time-based media, such as audio and video, which have content that can change over time. Adding hyperlinks to video can add an additional cognitive load, resulting in an increased likelihood of user confusion. While multi-level hyper-video summaries can allow people to view a video summary and, at any point, follow a link to access additional related details, users can still get lost trying to navigate the links.

Systems and methods in accordance with embodiments of the present invention can avoid such link navigation problems by building on the observation that people often do not actually want links to related content, but desire control over multiple views of related content or control over the amount of detail displayed about that content. A user interface metaphor for video summaries can be shifted from one that emphasizes links and link structure to one that completely eliminates links in the user interface. Such an approach can allow users to "change channels" instead of "navigating" between streams. By hiding links from the user, using a channel-based metaphor, the entire user experience changes from one of navigating along links to one of switching between related representations of related content. By replacing the explicit links in a hypermedia system user interface with implicit and algorithmically-generated links, certain problematic steps and cognitive processes can be eliminated that are otherwise associated with hypermedia navigation. These steps and processes can include, for example: detecting when links are available, explicitly following links, remembering which links have been followed, explicitly returning from a link, recognizing when the system implicitly returns from a link (e.g. when finished playing a sequence associated with a followed link), and maintaining a sense of context or location within a link structure. Instead of requiring a user to overcome the cognitive hurdles associated with "navigation," users are free to focus on controlling different views of multimedia content. Such an approach can also simplify hypermedia authoring and maintenance by replacing the need for defining and maintaining explicit links and link behaviors with a two-step process of defining correlated media streams and defining an algorithm for dynamically determining link behavior.

Such an authoring process can be simpler than the typical hypermedia authoring process in several respects. Once correlated media streams are defined, for example, those streams can be edited arbitrarily without breaking any explicit links. Clips can be repositioned, and clips or entire channels can be added or removed without the need for maintaining existing links. In addition, once algorithms for determining link behavior are defined, those algorithms can be re-used for many different sets of correlated media streams. Because the algorithms can be re-used, the process of defining a link behavior algorithm in some embodiments can be reduced to selecting an algorithm from a core set of pre-defined algorithms. In many cases, such as the example of multi-level hyper-video summaries, the authoring of correlated media streams can be entirely automated.

In one embodiment, links are hidden during the multimedia stream authoring process. One such authoring process consists of at least two major steps, the first of which can include the creation, definition, or assembly of the media streams, which may be linked temporally or semantically (e.g. multi-level video summaries). The second such step can include a mapping of media streams to channels, including an algorithm for automatically determining link behavior based on the stream correlation and the time at which a channel change is requested.

Figure 8:
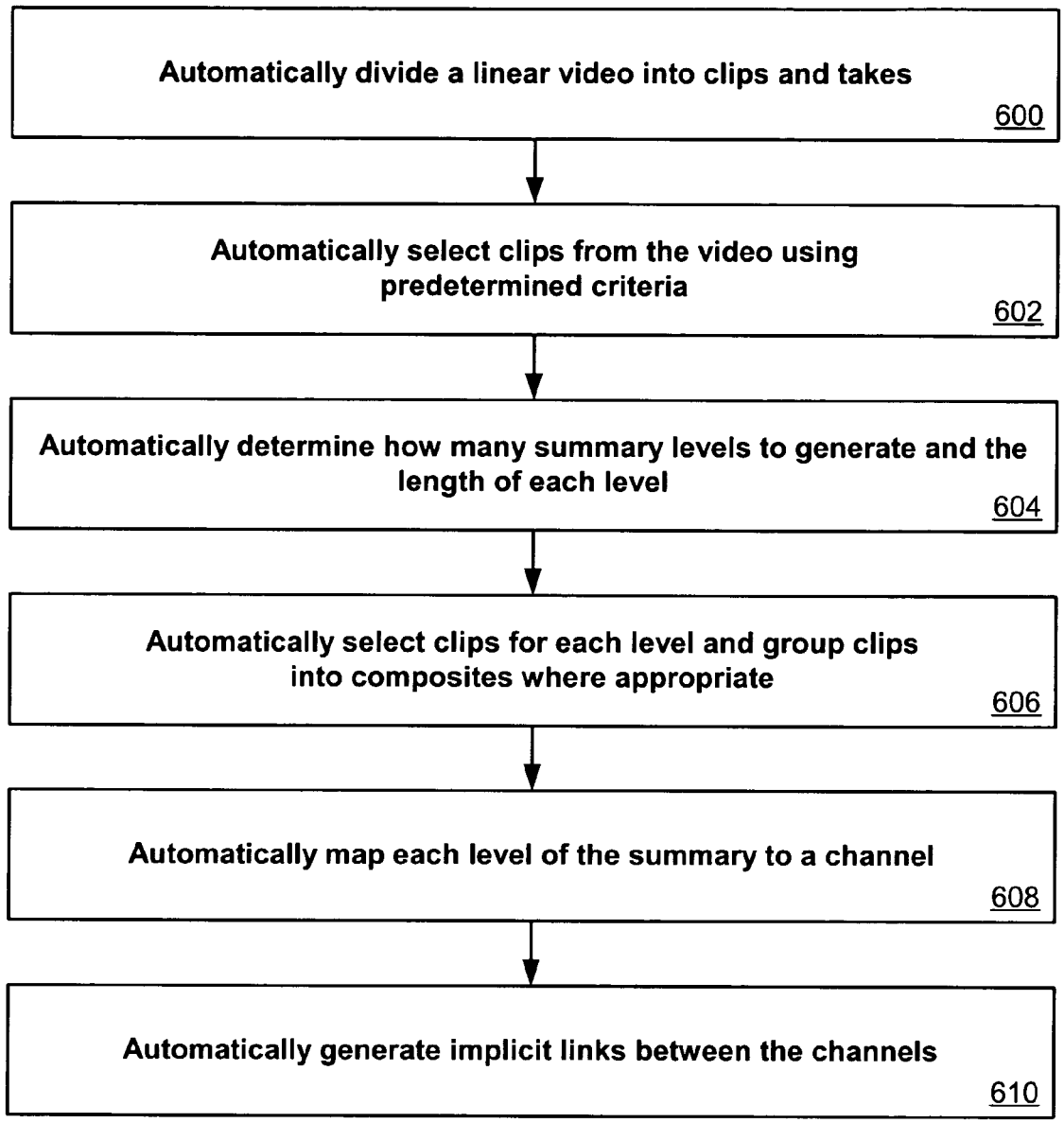
FIG. 8 is a flowchart showing a process for automatically generating multi-channel summaries in accordance with one embodiment of the present invention.

An example of such a method is shown in FIG. 8. A linear video can be automatically divided into clips and takes 600. Clips to be used in the channel-based summary can be automatically selected from the video using predetermined criteria 602. The number of levels to be generated can be automatically determined, as well as the length of each level 604. Clips can be automatically selected for each level, and can be grouped into composites where appropriate 606. Each level of the summary can be automatically mapped to a respective channel 608, and implicit links can be automatically generated between the channels 610.

Figure 9:
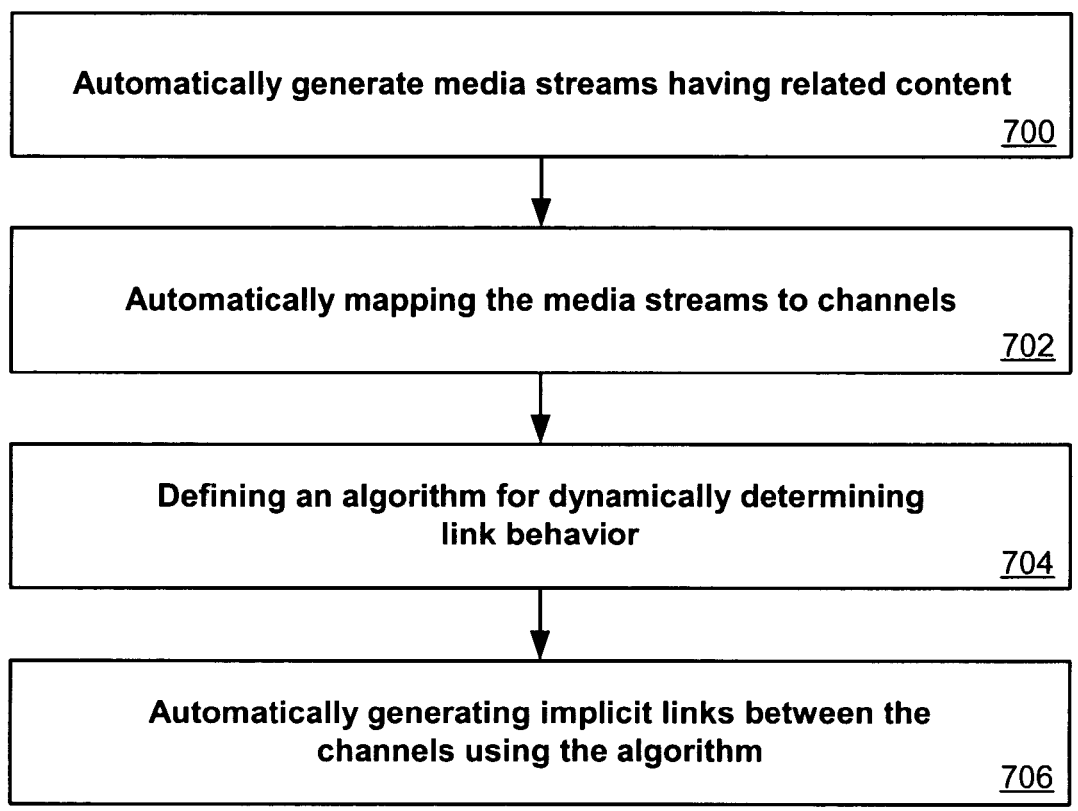
FIG. 9 is a flowchart showing another process for automatically generating multi-channel summaries in accordance with one embodiment of the present invention.

Another example is shown in FIG. 9. In this example, media streams having related content can be automatically generated from a video 700. The generated media streams can be mapped to respective channels 702, such that a user can switch between channels to view related content, such as further examples, additional scenes, or more detailed information. An algorithm can be automatically selected, generated, or defined in order to dynamically determine the links and link behavior between the channels 704. These implicit links can be automatically generated between the channels using the algorithm 706, such that a user can switch between channels in an appropriate display device, such as a video player on a personal computer or home video equipment.

Certain embodiments can be designed under the assumption that users will experience multimedia content within the context of a client "player" application that will allow the users to pause and "rewind" the current media sequence, as well as follow links to associated media sequences. A simplification can also be imposed at any time, in any stream, that there is at most one link to another stream. Such simplification can be useful from an authoring perspective as well as a user perspective, as both authors and users can have fewer links to manage and maintain. In practice, however, users may have multimedia players that provide the capability to follow a link and return to that point in the video clip that was playing when the user selected the link. In some cases this "interrupt and return" capability can allow users to take two links at once, one link back and one link forward to a new linked clip. In fact, if multimedia players provide the capability to "interrupt and return" back up multiple levels of links, users will effectively have multiple links that can be taken. While users may be able to take more than one link back to clips the users had been viewing, the users can be limited to taking at most one link forward.

Embodiments in accordance with the present invention can also take advantage of another simplification referred to herein as a video "composite." When a video composite is used to group clips at the source of a link, the link may be taken at any point in any clip in the composite. When a composite is used to group clips at the destination of a link, the composite can be treated as a single clip. Composites can be used to make sure that it is possible to follow one link "forward" to a higher numbered channel at any point in any stream, unless the user is already on the highest-numbered channel, and that it is possible to follow at least one link "back" to a lower numbered channel, unless the user is already on the lowest-numbered channel.

In an exemplary application of a simplification approach, the user of a hypermedia system having multi-level video summaries can be faced with the task of understanding the content of a particular video sequence. The user can accomplish this task by watching any of the media streams and "changing channels" at any time to receive more or less detail. Because all explicit links between the correlated media streams are hidden, the user can experience none of the cognitive overhead or spatial disorientation normally associated with link-based navigation.

Before a user can experience video summaries as correlated media channels, the channels must first be defined. Automatic techniques for generating multi-level video summaries can be used to determine the sequences of video clips that comprise the video summaries, such as those described above. The video summaries can be mapped to channels, such as by mapping each level to a different channel, such that the first channel corresponds to the briefest summary, or highest level, and successive channels map to successively more detailed summaries, or lower-level summaries.

For instance, channels can be determined by the multi-level video summary depicted in FIG. 4. Here the top-level, briefest summary 302 can be mapped to channel 1, an intermediate-level summary 304 can be mapped to channel 2, and the most-detailed summary, or the entire video 306, can be mapped to channel 3. Composites are used in channels 2 and 3 in the Figure to group clips for both the source and destination of links.

Exemplary Algorithms

A number of algorithms can be used to define link behavior in link summaries. Such algorithms can determine properties such as the sequence, file, and offset to load into a player when a user changes a channel. An algorithm can use information about the video summaries, such as the clip sequence, the media file, the offset where each clip is stored, the length of each clip, the composites that make up each summary, and the associations between composites. This information can be readily available from the summary representation, as this information can be used by a digital video player to play a summary sequence.

An exemplary link behavior algorithm that can be used in accordance the above approach is given by the following:

```
if (following or returning from a link) {
    if (source clip exists in the destination sequence)
        stay at the current position in the current
        clip, but switch to the new channel's play
        sequence;
    else if (changing back to a less detailed summary &&
            the source composite has played more than T%
            for some threshold T)
        jump to the end of the associated
        composite;
    else
        jump to an offset in the destination composite
        proportional to the amount of time the source
        composite has played;
}
```

Such an algorithm can be integrated with a digital video player to compute the link behavior as a user changes channels. If playback is required on an unmodified player, channel change behavior can be pre-computed for each pair of associated composites and the logic can be stored within a multimedia file format, such as MPEG-4. Such an approach can, however, imply certain restrictions on the algorithms such as eliminating the possibility of a proportional jump. If it is desired to jump to the beginning of a composite when following or returning from a link, an algorithm can include a step such as the following:

```
if (following or returning from a link)
    jump to the beginning of the associated composite;
```

In the case of multi-level video summaries, certain embodiments can require that successively less-detailed summaries be proper subsets of each other. Such a requirement can guarantee that each possible source clip will exist in the destination sequence when changing channels to a more detailed summary. Such a requirement can smoothly preserve temporal continuity, which can result in a more satisfying user experience when changing channels.

Figure 6:
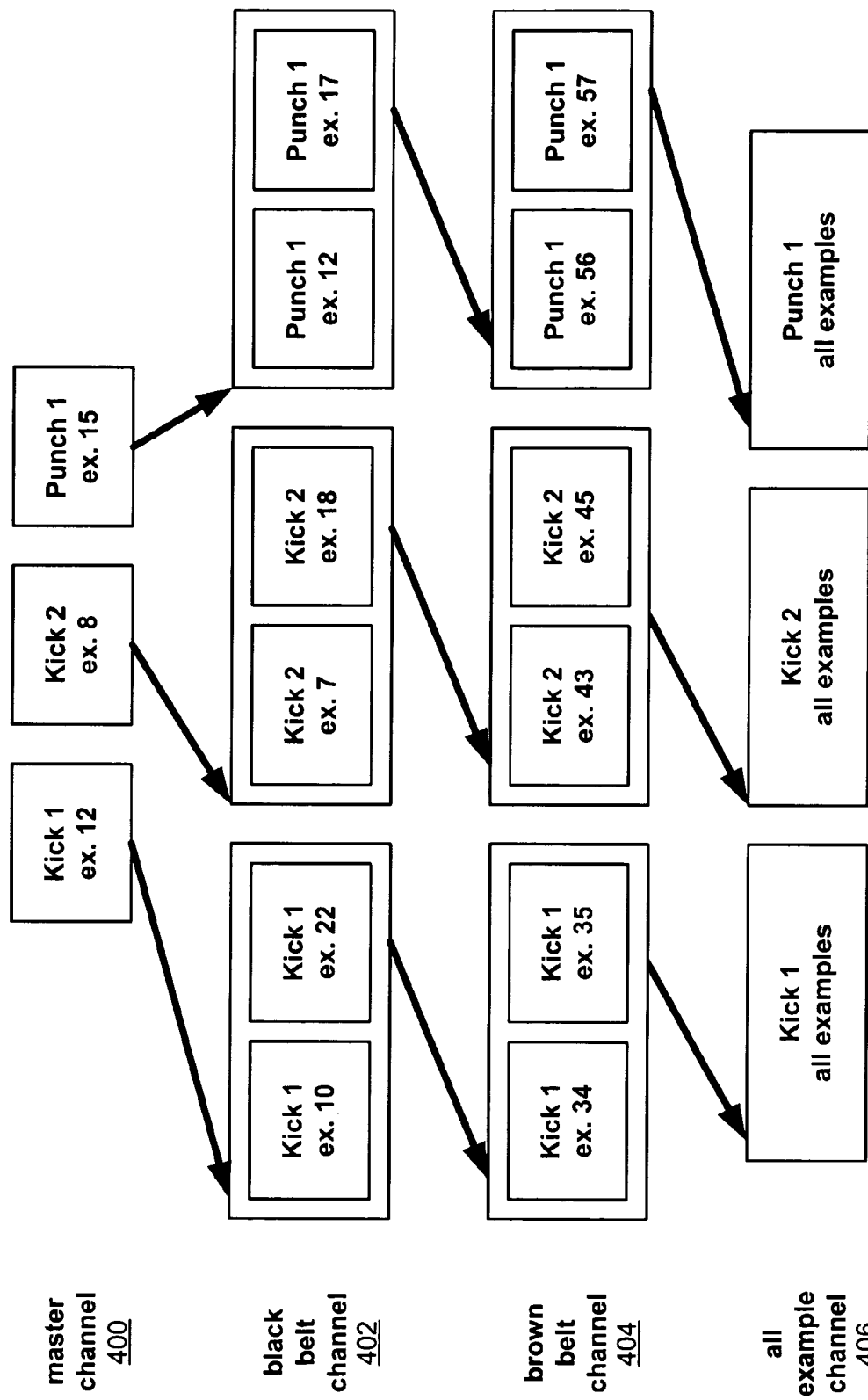
FIG. 6 is a diagram showing a multi-level summary using the channel metaphor in accordance with one embodiment of the present invention.

An example algorithm for correlated media channels can be demonstrated using a training hyper-video with several demonstrations of a process or technique that a user is trying to learn, such as a martial arts kick. The correlated media channels can be arranged as in FIG. 6, with demonstrations of each move as performed by the master instructor on the main or "master" channel 400, demonstrations of the same moves performed by the best students or black belts on the next channel 402, and demonstrations of the same moves performed by students of successively less ability on successively higher-numbered channels 404, 406. Unlike the multi-level summary example in which successive channels contained an expanded, more detailed version of the same content, here successive channels can contain additional examples of the same content. While learning a particular move, such as Kick 1, a user can switch to a higher-numbered channel to view more examples of Kick 1. If the videos are examples of the user's actual class, a particular channel might show the user performing Kick 1, such that the user can choose to simply watch that channel for each of the moves, or can switch between the instructor and the user to determine or evaluate technique.

As in the multi-level hypertext summary example, the authoring task can consist of defining the media streams and their correlations. Each stream can be ordered by category (Kick 1, Kick 2, punches, etc.), while successive streams can store additional examples that may be of lower quality or relevance. In this case a more simplistic algorithm can be used to determine link behavior. Because the channels do not store the same clips, the link behavior can simply switch to the beginning of the associated composite each time a channel is changed. If the length and arrangement of the clips are substantially similar for each channel, the link behavior can alternatively switch to approximately the same point in the other channel.

Audio

Systems and methods in accordance with embodiments of the present invention also have applications in other media, such as audio-only hypermedia. For example, a version of the popular audio "books on tape" for digital media can provide a channel-changing interface for listening to linked audio summaries providing different amounts of detail. Audio summaries can be created and organized using methods similar to those discussed above with respect to multi-level video summaries, using similar algorithms to those discussed above. Users can locate particular positions in the audio content by first listening to lower-numbered channels, or summaries with less detail, to locate particular chapters. A user can then switch to higher-numbered channels, or summaries with more detail, to locate particular sections. Once the section of interest has been located, the user can switch to the highest-numbered channel for the unabridged content. Certain embodiments can also generate summaries using a combination of the above-described criteria for both audio and video, such as for an outdoor concert video where the amount of lighting or "goodness" parameters might not change substantially but the sound level will change dramatically between songs.

Perception of Continuity

One interesting question concerning the channel metaphor described above is how a user will perceive the continuity of media on channels that are not currently being displayed to the user. When changing between channels on a television set, for example, a user knows that the media on other channels will continue to broadcast whether or not the user is watching those channels. If the user changes from channel 4 at time T1, and changes back to channel 4 at time T2, the portion of the media that was broadcast between time T1 and T2 is essentially lost to the user (disregarding rebroadcast, recording, etc.).

In the case of digital media, and particularly digital media in a non-broadcast context, the perception that media-related information would be lost is less of a concern. Users are accustomed to digital media being available at any time, such that a user can always go back and locate the media for viewing. The perception of media continuity can still be at least somewhat determined by the link return behavior. For example, an algorithm such as those described above can be selected that will return to the end of the "calling" sequence when a user completes watching a lower-level summary of that sequence on another channel. The algorithm can also use a threshold T, which may be any appropriate value such as about 25%, about 50%, or about 75%, such that if the user returns after watching a percentage of a lower-level sequence at least as great as a threshold T percentage of that sequence, the user can be directed to the end of the higher-level sequence. The perception of the user may then be that changing channels to a more-detailed summary does not stop the less-detailed summary channel from playing. This behavior may be expected by a user with content such as multi-level summaries, which are, in general, proper subsets of each other, as there would be little point in viewing a less-detailed summary after viewing the associated, more-detailed summary of the same content. If a user watches half of the more detailed content and loses interest, the user may also simply wish to move on to the next sequence, instead of viewing the rest of the higher-level summary that is no longer of interest.

In contrast, in a situation such as that shown in FIG. 5 can exist where successive channels are not subsets of each other. In this case, it may not be desirable for an algorithm to define the link return behavior to skip to the end of calling sequence. Using an algorithm that always jumps to the beginning of a linked composite can be overly simplistic, and can cause viewers to see some clips more than once in some cases, but can provide the perception that changing channels to a more-detailed summary effectively stops the less-detailed summary channel from playing.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method for automatically generating a multi-level video summary, comprising:
   automatically dividing a video file into multimedia stream segments without user input using segmenting criteria;
   automatically generating at least two summary levels without user input, wherein each of the summary levels has a different level of detail and each of the summary levels is a linear multimedia stream which includes at least one of the multimedia stream segments from the video file, the multimedia stream segments in each of the summary levels selected using selection criteria and at least one algorithms; and
   automatically generating navigational links between the multimedia stream segments in the summary levels without user input, wherein one or more algorithms are used to dynamically determine link behavior, the navigational links connecting the multimedia stream segments containing related material;
   providing a user interface to allow a user to refine the automatically generated navigational links, wherein each level of the summary is presented in a layout as a horizontal list of keyframes, wherein the navigational links are pictorially represented as arrows going into and out of the keyframes, and wherein the user refines the navigational links by manipulating the pictorially represented arrows.

2. A method according to claim 1, further comprising:
   automatically determining the length of each summary level.

3. A method according to claim 1, further comprising:
   automatically grouping multimedia stream segments in a summary level into a video composite, the video composite including at least two multimedia stream segments in the summary level.

4. A method according to claim 1, further comprising:
   providing a user interface whereby a user can view the multi-level video summary, the user interface allowing the user to navigate between summary levels using the navigational links.

5. A method according to claim 1, further comprising:
   automatically determining the number of summary levels to generate.

6. A method according to claim 1, further comprising:
   automatically determining which navigational links to generate.

7. A method according to claim 1, wherein:
   the selection criteria includes criteria selected from the group consisting of goodness, smoothness of camera operation, amount of camera motion, location in the video, and lighting level.

8. A method according to claim 1, further comprising:
   providing the ability for an author to refine the navigational links within the automatically-generated multi-level video summaries.

9. A method according to claim 1, further comprising:
including the first and last multimedia stream segments from the video file in the summary levels.

10. A method according to claim 1, further comprising:
ensuring that the selection of multimedia stream segments includes multimedia stream segments distributed throughout the video file.

11. A method according to claim 1, wherein:
each navigational link includes a source anchor in one summary level, a destination anchor in another summary level, and at least one return behavior, wherein the placement of the source anchor and the destination anchor within each summary level is dynamically determined using an algorithm while the multimedia stream segments are being played.

12. A method according to claim 11, wherein:
each navigational link further includes a label.

13. A method according to claim 11, further comprising:
automatically grouping some of the multimedia stream segments in a summary level into a video composite that will be a source anchor for a link to another summary level.

14. A method according to claim 11, wherein:
the return behavior includes a return position selected from the group consisting of the beginning of a multimedia stream segment, the point in a multimedia stream segment at which a navigational link is followed, and the end of a multimedia stream segment.

15. A method according to claim 1, wherein:
the multimedia stream segments in each summary level are in chronological order as the multimedia stream segments appear in the video file.

16. A method according to claim 1, wherein:
each summary level includes a different number of multimedia stream segments.

17. The method according to claim 1, further comprising:
mapping of the multimedia steams to channels; and
determining the link behavior based on multimedia stream correlations and the time at which a channel change is requested from a user.

18. The method according to claim 1, wherein a less detailed summary level does not include a multimedia stream segment that is found in a more detailed summary level.

19. The method according to claim 1, wherein the navigational links are not linked to any keyframes.

20. A system for automatically generating a multi-level video summary, comprising:
means for automatically dividing a video file into multimedia stream segments without user input using segmenting criteria;
means for automatically generating at least two summary levels, wherein each of the summary levels has a different level of detail and each of the summary levels is a linear multimedia stream which includes at least one of the multimedia stream segments from the video file, the multimedia stream segments in each of the summary levels selected using selection criteria and at least one algorithm; and
means for automatically generating navigational links between the multimedia stream segments in the summary levels, wherein one or more algorithms are used to dynamically determine link behavior, the navigational links connecting the multimedia stream segments containing related material;
providing a user interface to allow a user to refine the automatically generated navigational links, wherein each level of the summary is presented in a layout as a horizontal list of keyframes, wherein the navigational links are pictorially represented as arrows going into and out of the keyframes, and wherein the user refines the navigational links by manipulating the pictorially represented arrows.

* * * * *